US006938076B2

(12) United States Patent
Meyer et al.

(10) Patent No.: US 6,938,076 B2
(45) Date of Patent: Aug. 30, 2005

(54) SYSTEM, COMPUTER PRODUCT AND METHOD FOR INTERFACING WITH A PRIVATE COMMUNICATION PORTAL FROM A WIRELESS DEVICE

(75) Inventors: Steven P Meyer, Richmond Hill (CA); Pedro P. Nascimento, Mississauga (CA); Andrew Cheung, Mississauga (CA)

(73) Assignee: 01 Communique Laboratory Inc., Ontario (CA)

( * ) Notice: Subject to any disclaimer, the term of this patent is extended or adjusted under 35 U.S.C. 154(b) by 0 days.

(21) Appl. No.: 09/953,897

(22) Filed: Sep. 18, 2001

(65) Prior Publication Data

US 2002/0174195 A1 Nov. 21, 2002

Related U.S. Application Data

(60) Provisional application No. 60/279,714, filed on Mar. 30, 2001.

(51) Int. Cl.[7] .............................................. G06F 15/16
(52) U.S. Cl. ........................ 709/219; 709/206; 709/229
(58) Field of Search ................................ 709/219, 206, 709/229, 217, 223, 224, 228, 249; 370/469; 340/531

(56) References Cited

U.S. PATENT DOCUMENTS

| 5,799,154 | A | * | 8/1998 | Kuriyan ...................... 709/223 |
| 5,844,969 | A | | 12/1998 | Goldman et al. |
| 5,978,837 | A | | 11/1999 | Foladare et al. |
| 6,115,393 | A | * | 9/2000 | Engel et al. ................. 370/469 |
| 6,144,839 | A | | 11/2000 | Foladare et al. |
| 6,226,668 | B1 | | 5/2001 | Silverman |
| 6,272,545 | B1 | * | 8/2001 | Flanagin et al. ............ 709/228 |
| 6,359,557 | B2 | * | 3/2002 | Bilder ........................ 340/531 |
| 6,397,256 | B1 | * | 5/2002 | Chan et al. ................. 709/229 |
| 6,421,717 | B1 | * | 7/2002 | Kloba et al. ................ 709/219 |
| 6,421,781 | B1 | * | 7/2002 | Fox et al. .................... 713/201 |
| 6,438,585 | B2 | * | 8/2002 | Mousseau et al. .......... 709/206 |
| 6,446,123 | B1 | * | 9/2002 | Ballantine et al. .......... 709/224 |
| 6,463,463 | B1 | * | 10/2002 | Godfrey et al. ............. 709/206 |
| 6,609,004 | B1 | * | 8/2003 | Morse et al. ............. 455/456.5 |
| 6,654,786 | B1 | * | 11/2003 | Fox et al. .................... 709/203 |
| 6,665,711 | B1 | * | 12/2003 | Boyle et al. ................. 709/219 |
| 6,668,169 | B2 | * | 12/2003 | Burgan et al. ........... 455/435.1 |
| 6,701,378 | B1 | * | 3/2004 | Gilhuly et al. .............. 709/249 |

* cited by examiner

*Primary Examiner*—Ayaz Sheikh
*Assistant Examiner*—Christian La Forgia
(74) *Attorney, Agent, or Firm*—Eugene J. A. Gierczak; Miller Thomson LLP

(57) ABSTRACT

A system for providing provisioning and operation at a wireless device comprising a first computer comprising a communication facility adapted to communicate information to remote computers and the wireless device; a second computer comprising a locating facility for locating the first computer; and a wireless device comprising a microprocessor and a mobile communication facility; wherein the first computer, the second computer and the wireless device are connected to the Internet; wherein the locating facility is adapted to facilitate communication between the first computer and the wireless device; and wherein the first computer and the wireless device are adapted to permit a user of the wireless device to access information at the first computer from the wireless device.

46 Claims, 9 Drawing Sheets

SYSTEM, COMPUTER PRODUCT AND METHOD FOR INTERFACING WITH A PRIVATE COMMUNICATION PORTAL FROM A WIRELESS DEVICE

This application claims benefit of provisional application 60/279,714, filed Mar. 30, 2001.

FIELD OF THE INVENTION

This invention relates in general to a system, computer product and method for accessing functions of a private communication portal utilizing a wireless device. This invention further relates to a system, computer product and method for processing instructions provided by a wireless device in operation of a server computer such as a private communication portal. This invention also relates to a method for implementing a private communication portal that permits for remote accessing thereof from a wireless device, and processing instructions at such private communication portal from the wireless device.

BACKGROUND OF THE INVENTION

Individuals and businesses today communicate through a variety of messages including electronic mail (including e-mails with video or voice attachments or "instant messages" such as AOL™ instant messages), pager messages, facsimile (fax) and electronic voice mail, document transfer, file transfer and structured data transfer.

In many cases, a multi-user server located in a remote location and accessed electronically over a network manages such communication. Such servers not only control access to personal data belonging to a plurality of users, but they also act as repositories for such personal data, either temporarily or over a significant period. Consequently, issues of security, scalability, dependability and concurrent access to data are significant.

Single-user programs for managing such variety of messages are known, but such known programs do not provide full remote access via the Internet to management of messages, documents, data files and contact information. The use of the Internet is desirable for numerous reasons, including the common use of the Internet Protocol as a communication standard, the general availability of electronic devices that are Internet-enabled and the cost savings of using the Internet. Full Internet access is desirable because message, document, data and contact management users may want to access their message and contact management system from a plurality of locations and/or plurality of communication devices (e.g. lap top, cellular phone or hand held computer etc.). Full remote access permits the receipt of messages at any location on any type of communication device, with remote access to functions of the message management system such as address books, security settings, rules (e.g. automated response), text-to-speech functionality etc.

It is desirable to provide a system, computer product and method that does not require the use of a multi-user server. In other words, it is desirably to provide the "unified" capability of managing the variety of information described where there is no $3^{rd}$ party service provider who acts as an intermediary between the user and entities with whom the user communicates. This results in a reduction in service fees charged by such $3^{rd}$ party service provider. It is further desirable to provide such a system, computer product and method that is flexible, permits remote access to personal data, and provides security of such personal data.

Such a private communication portal is disclosed in co-pending patent application Ser. No. 09/595,533 assigned to 01 Communique Laboratory Inc. ("Co-Pending Application").

In this disclosure, by "private" what is meant is that the communication portal is dedicated to a user rather than multiple users as is the case with $3^{rd}$ party intermediary systems described above. It should also be understood from the outset that in referring to "private communication portal", the word "communication" is used in accordance with its broad technical definition. In particular, "communication" for the purpose of this document means exchange or accessing of any information, including information formats, using predefined protocols understood by communicating entities. It should be understood that for "communication" to occur, there is no requirement for a human user. "Communication" can in this way be contrasted from "messaging" which is generally understood to relate to communication between more than one human user.

Also, by "portal" what is generally understood is a means for facilitating communication from point A to B. More than one interconnected computer or process may co-operate to provide a single "portal". For example, a first computer or process comprising the "portal" may provide means for locating B at least once. Thereafter, communication between A and B may be facilitated through a second computer or process independent of the first computer or process.

In operation, the present invention provides a private communication portal for remotely managing and accessing messages, as described herein. However, it should be understood that messages are only one form of data that can be communicated or accessed in co-operation with the present invention. The invention provides means for operating a private server as a communication server for a variety of purposes, including video monitoring. For example, the private communication portal described herein provides means for accessing and managing such data remotely, such as forwarding images detecting movement to an observation station.

One problem of providing such a private communication portal system, computer product and method is integrating same with wireless devices. At the date of this patent application there were a number of different wireless devices. First, there are WAP-enabled cell phones. These devices have a small text display and allow the user to set up a connection session to the Internet. Connection speed on existing wireless networks is relatively slow (approximately 9600 bps) and generally only a limited amount of content can be viewed at a time. Furthermore, WAP-enabled cell phones generally have numeric keypads only and therefore data entry is laborious. Second, there are 2-way pager devices. These devices of a second type generally establish "session-less" connections to the Internet, i.e. they send and receive messages without the overhead of logging in, establishing credentials, etc. Examples of such 2-way paging devices include Glenayre's @ctivelink™ and RIM's Blackberry™ pagers. A third type of wireless device is known as a Wireless Personal Digital Assistant (PDA) or wireless terminal. These devices provide a small screen and permit inputting of text. Some wireless terminals include an ASCII keyboard. The wireless terminal operates similarly to the WAP-enabled cell phone, except the wireless terminal can generally support a richer user experience, e.g. colour screens and audio output and generally have more processing capability than WAP-enabled cell phones.

The WAP-enabled cell phones, paging and 2-way paging devices and wireless terminals referenced above are collectively referred to as "Wireless Devices" in this disclosure.

The above referenced Wireless Devices are commonly associated with a known wireless network. Communication with such Wireless Devices occurs via such wireless networks. Therefore, where appropriate the use of the term "Wireless Devices" in the sense of for example sending a message to a "Wireless Device" implies the use of the related wireless network.

The private communication portal referred to herein permits connection with such Wireless Devices and their related networks. For example, when a message is received by the private communication portal, a notification can be sent to the Wireless Devices, in a manner that is known. For example, this notification can include information regarding the identity of a caller who has left a voicemail at the private communication portal. It is desirable to be able to elicit a response from the private communication portal using a Wireless Device. For example, where a user is notified by means of a Wireless Device that "VOICEMAIL RECEIVED FROM X", it is desirable that user be able to engage a "OBTAIN VOICEMAIL" function at such Wireless Device. In response to such function, it is further desirable that the wireless network be able to deliver a message to the private communication portal requesting that the private communication portal call the telephone number phone of the user and provide in such telephone call the content of the voice mail. Likewise, for a "FACSIMILE RECEIVED FROM Y", it is desirable that the user may engage the "FORWARD FAX" function at such Wireless Device to request that the private communication portal call the facsimile number specified by the user and deliver the message to the facsimile device at that number.

Prior art solutions have been conceived for delivering the functionality described to Wireless Devices.

For example WinFax Pro 7.0™ of Delrina provided notification to pager functionality as early as November, 1995. This prior art product comprises a "RECEIVE RULES" function that permits forwarding of messages and/or notification to a pager device depending on certain conditions being satisfied, e.g. message arriving from a particular sender. Notification to the pager device is provided by this device by dialing up the paging service using a telephone network.

Another example of a prior art solution is FaxWorks™ by Global Village Communications from 1994. This computer product provided capability for forwarding fax messages and for sending receipt notifications to a pager device. This particular prior art computer product also performed notification upon receipt of a voice message or a fax message.

Another prior art solution is the Communicate!™ product of 01 Communique Laboratory Inc. which permits notifications to be sent to an alphanumeric pager. When a message arrives (in this case a voice message, fax or e-mail), this prior art computer product contacts a paging service and sends a short notification message to the specific pager informing the user that a message has been received. More specifically, when a message arrives (in this case a message is one of: voice message, fax or an e-mail) the application will contact a paging service and send a short notification message to the specific pager informing the user that a message has been received. In line with the technology of the day, this application used the dialup telephone network to contact the paging service. This prior art product also provides forwarding to an e-mail account by accessing the user's e-mail accounts and downloading incoming e-mail messages. It then forwards the e-mail to another account. Note that e-mail send and receive is achieved by dialing up to the Internet and connecting to the e-mail server(s).

Octal Unified Messaging (Lucent Technologies) is a large centralized server-based system that supports some of the message format translations, such as converting text e-mail to speech and text e-mail to fax. This system also supports pager notification of new messages.

Motivus™ from Veratium is a prior art server based product that allows users of mobile devices, such as RIM Blackberry™ pagers and Internet-connected Palm™ organizers to access messages and files stored in a Microsoft Exchange server. It also provides support for the Exchange calendaring feature.

A still other prior art solutions that addresses similar subject matter to the present invention are EudoraMail™ and EudoraWeb™ from Eudora. These applications are designed for the Palm™ handheld operating system. EudoraMail works in conjunction with a desktop component to synchronize data. Synchronization allows users to read, send, and delete messages from your desktop computer from your Palm device. Filters allow users to transfer a fixed number of messages or the most current messages to Eudora on your Palm device. Synchronization truncates messages above a certain size. Synchronization downloads messages on request. This priort art solution supports SSL (Secure Sockets Layer) and TLS (Transport Layer Security) for authentication of users' mail servers, and encrypted communication with those servers for data privacy. Users of this prior art solutions can launch EudoraWeb™ by tapping on URLs on a Palm™ device. EudoraWeb™ is a mini HTML browser tailored to the Palm™ environment. EudoraWeb™ supports a subset of HTML 3.2 features.

The prior art solutions discussed disclose means for notifying the user of a Wireless Device that a certain event has occurred at another location, such as the receipt of an email. However, they do not provide means for acting on such notification.

U.S. Pat. No. 6,226,668 issued to Silverman relates to a web messaging system that allows a subscriber to receive messages from a wide variety of multimedia sources. If a caller attempts to contact a subscriber but the subscriber is unavailable, the system will record the message in digital format, generate a web page and password, and send a web page identification and password to the subscriber via a paging medium. The subscriber can then access the web page, enter the password, and retrieve the message.

U.S. Pat. No. 5,844,969 issued to Goldman et al. discloses a communication system for remotely re-selecting and re-transmitting received electronic mail at a destination terminal to another destination terminal using a remote communication device, e.g., a two-way pager. The system includes an electronic mail server coupled to an electronic mail network, a backbone and an alert network. The electronic mail server receives electronic mail messages from the electronic mail network or from the backbone network. Each received mail message includes a sender identification, an email identification and a destination terminal. The server generates and transmits over the alert network a select signal and a message summary to the communication device when an email has been received from a destination terminal. A communication device stores the message summaries and displays them as a user scrolls the message summaries. The user through a keyboard in the device may select and revise a message summary by entering a new destination in the message summary. Using a send key, the user transmits the revised message summary to the server coupled to the destination terminal. The server in response to the transmitted revised message summary accesses a database to locate a copy of the received message or contacts and instructs the destination terminal to forward a copy of the received message to the new destination terminal via the server or an alternate server.

U.S. Pat. No. 5,978,837 issued to Foladore et. Al. provides for an intelligent pager that remotely manages an email server that receives email messages transmitted over an email network. Useful email messages can be identified by the pager and separated from the junk mail. The pager remotely controls the server to forward messages as directed by the recipient. The email server sends a summary of the email message to the pager over a different network so that the pager can select a forwarding destination for the message. The pager sends a selection signal to the email server which then forwards the email message to the selected destination. The email message can be forwarded by the server over another network, such as the public telephone network, to a computer or a FAX machine at the recipient's office, home or other destination.

The prior art solutions discussed support e-mail and browsing capabilities, but do not provide message or event notification and remote access of messages or events with a private communication portal from Wireless Device. The prior art solutions also do not provide a system, computer product and method for acting on message or event notifications at a Wireless Device that is flexible. In regard to this last disadvantage, there is a need for system, computer product and method that permits acting on message and event notifications from a Wireless Device notwithstanding changes to the source of the message or event notification.

Another disadvantage of such prior art solutions is the time delay between receipt of a message at a first computer and receipt of a notification at a Wireless Device. For example, with respect to a Wireless Device that is a pager associated with a pager network, the pager network generally comprises a pager instruction transfer means, such as a mail server, or more particularly, an SMTP server for communicating messages related to the operation of the paging networks, in a manner that is known. In the particular example cited above, the request to the private communication portal is generally communicated to the SMTP server, which in turn is communicated to the private communication portal by means of the Location Facility disclosed in the Co-Pending Application.

The private communication portal is generally connected to the Internet in a manner that messages received (by way of example) by the private communication portal are not provided immediately, but rather subject to a time delay, as is well known. In particular, in most known implementations of the private communication portal, such messages are collected, for example, by the Internet Service Provider's server computer by polling such server computer from time to time. This time delay is in some cases a consequence of technical limitations of such Internet access, or in other cases, a consequence of system resource saving procedures.

In providing the remote response using a pager network as described above, the time delay referred to can cause relatively significant inconvenience. For example, in the specific example provided, if a user of the pager device and private communication portal requires delivery of a voice mail immediately, relatively significant wait for such delivery may cause inconvenience.

Therefore there is a need for a private communication portal, and method of implementing the same, that minimizes the impact of such time delay. There is a further need for a private communication portal that delivers notifications of events to a Wireless Device, and supports action on such notifications. There is a further need for system, computer product and method for introducing services accessible from a Wireless Device.

SUMMARY OF THE INVENTION

In accordance with yet another aspect of the present invention, a system, computer product and method is provided for delivering event notifications from a private communication portal to a Wireless Device, and accessing data at the private communication portal from the Wireless Device.

BRIEF DESCRIPTION OF THE DRAWINGS

A detailed description of the preferred embodiment(s) is(are) provided herein below by way of example only and with reference to the following drawings, in which.

Figure 1:
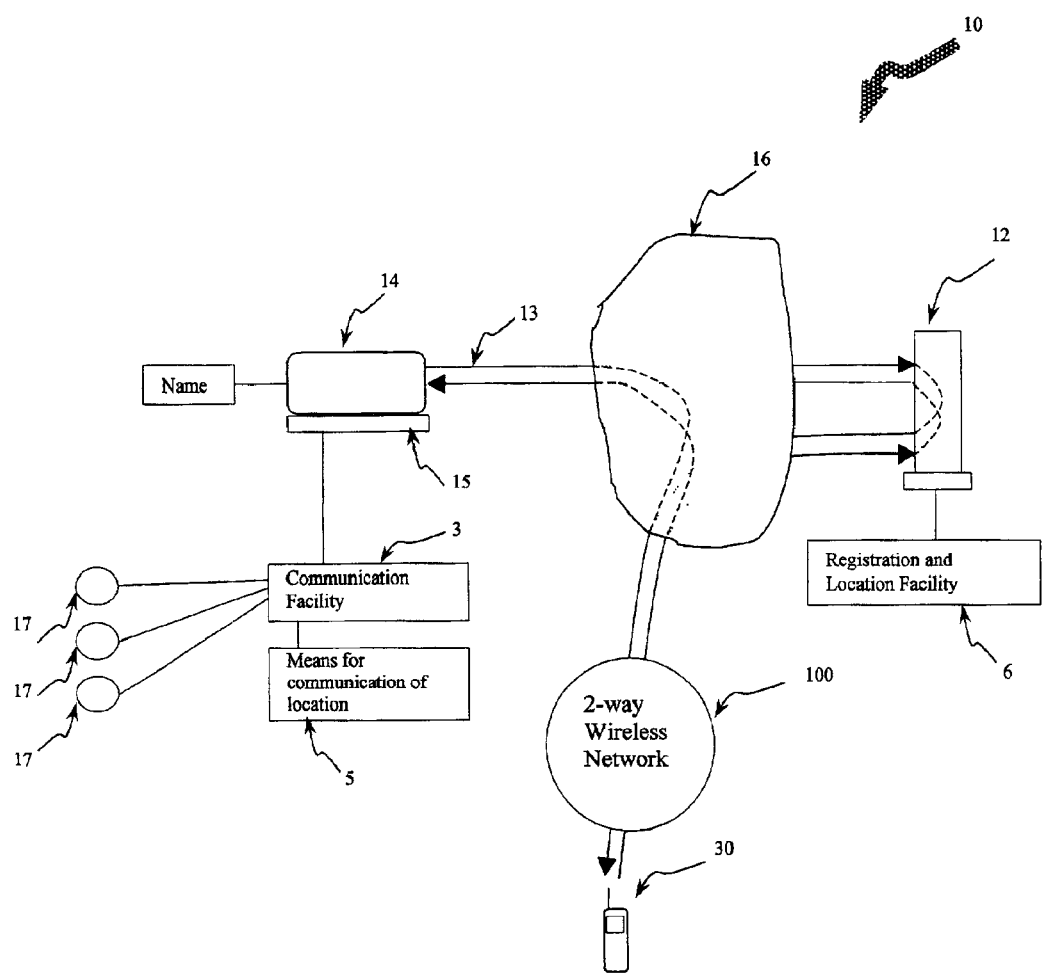
FIG. 1 is a system resource flowchart, in accordance with a first preferred embodiment of the present invention, illustrating the connection of the system to a wireless network that supports a mobile browser.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is illustrated in a system resource flowchart illustrating the system resources of the first preferred embodiment of the present invention illustrated herein. In particular, FIG. 1 illustrates the resources that comprise the private communication portal or "PCP" 10 of the present invention. PCP 10 comprises a multiple computer architecture further comprising a Server Computer 12, Private Server 14 and Wireless Device or Mobile Client Device 30. It should be understood that Private Server 14 may comprise a network station, personal computer terminal or server, embedded computer, set-top box or network gateway, provided that such Private Server 14 is devoted to a private user who may be a business or individual. The Private Server 14 also comprises a message and data management server 15, as best illustrated in FIG. 1 and a network name that identifies the particular private server, as is well known.

It is desirable to provide Private Server 14 with a permanent Internet connection 13 provided, for example, by a coaxial cable connection or high speed xDSL telephone connection or the like, also shown in FIG. 1.

Server Computer 12 is connected with unrestricted access to an interconnected network of computers such as the Internet 16. Server Computer 12 may comprise one or more computers, as is well known.

Private Server 14 is provided with a computer product of the present invention dedicated to Private Server 14. In a first preferred embodiment of the present invention, best illustrated in FIG. 1, this computer product provides a communication facility 3 and means for communication 5 of the location of Private Server 14 on a computer network such as the Internet to Server Computer 12, as further described below. The communication facility 3 can be provided with interfaces with a number of facilities 17 that generate data, in a manner well known to those skilled in the art, such as messaging facilities, monitoring facilities (security, environmental etc.), database facilities and the like. As is explained below, the computer product of the present invention presents means for remotely accessing the data.

Figure 2:
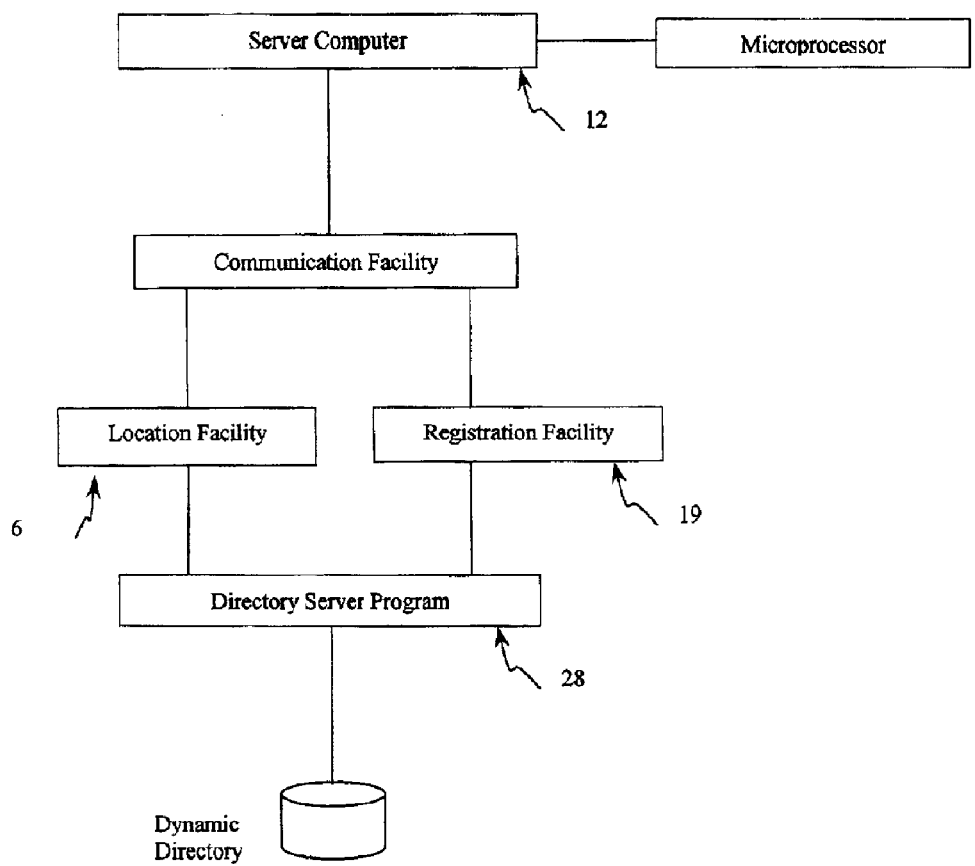
FIG. 2 is a program resource diagram illustrating the resources of the location computer product of the present invention residing on a public server connected to the Internet.

In another aspect of the first preferred embodiment of the present invention, a computer product is provided, as illustrated in FIG. 2, at the Server Computer 12 that communicates with the computer product dedicated to Private Server 14. The server computer product, illustrated in FIG. 1, provides a Registration and Location Facility 6 or means responsive to the means for communication 5 of the location of Private Server 14 for providing remote access to the Private Server 14, as explained below.

It should be understood that the first preferred embodiment of the present invention comprises a system, computer product and method for providing data exchange between a private communication portal to a Wireless Device, wherein the Wireless Device is a "Thin Client", namely a Wireless Device that supports a browser.

In contrast, the second preferred embodiment of the present invention comprises a system, computer product and method for providing data exchange between a private communication portal and a Wireless Device, wherein the Wireless Device is a "Smart Client" that is connected to a Message Transfer Agent, as explained below. The "Smart Client" implementation is used in relation to wireless networks that use proprietary communication protocols as is the case with 2-way pager networks, for example, or Wireless Devices that do not support a browser. In either case a Message Transfer Agent (as described below) is used to obtain the information required from Private Server 14, and the computer product provided to the Wireless Device in accordance with this invention provides known browser-type functionality at the Wireless Device by means of a computer product described below.

The Message Transfer Agent 100 may comprise by way of example only, a known SMTP server. Message Transfer Agent 100 is adapted to process instructions received from the Mobile Client Device 30. This particular implementation of the computer product of the present invention also uses the Message Transfer Agent 100 to send messages and data to the Mobile Client Device 30 for display to the user. In the second preferred embodiment of the present invention, Message Transfer Agent 100 is dedicated to the functions of communication of messages, data and instructions between the Private Server 14 and Mobile Client Device 30 in a "Smart Client" type network such as, for example, a 2-way pager network.

Private Messaging and Information Management Facility

Figure 3:
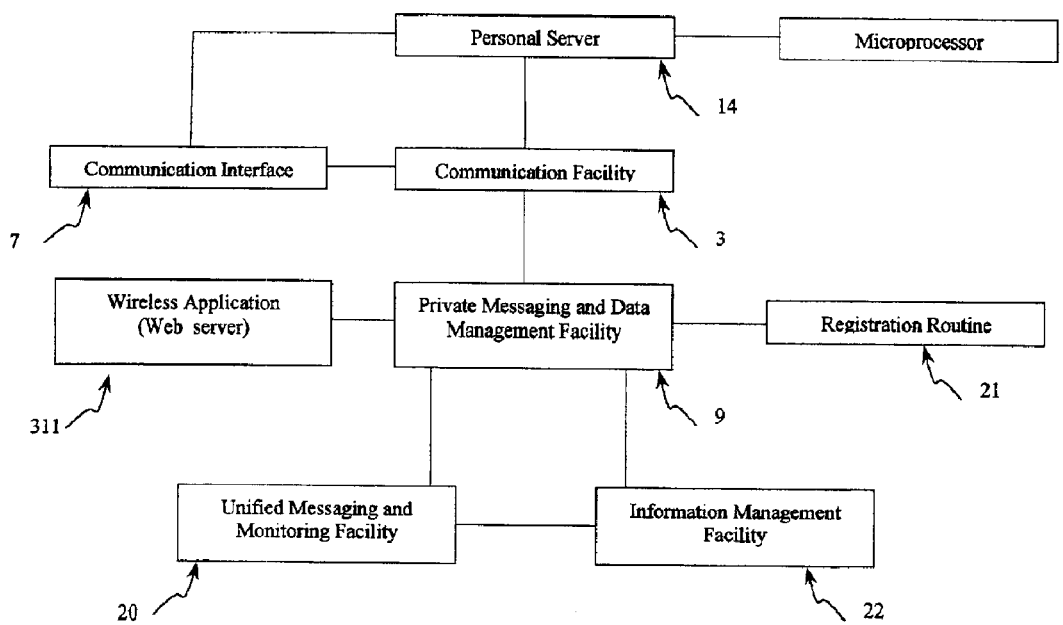
FIG. 3 illustrates the functions of the Personal Server of the present invention.

As illustrated in FIG. 3, the communication facility 3 of Private Server 14 further comprises a communication interface 7 and communication software program 9 or Private Messaging and Information Management Facility which are operably associated. The Private Messaging and Information Management Facility 9 comprises two principal elements, namely a Unified Messaging and Monitoring Facility 20 and Information Management Facility 22.

The principal functions of Information Management Facility 22 are: entering and retrieving database information, such as names, addresses, company information, personal information, contact history and the like; retrieving and displaying documents.

Figure 4:
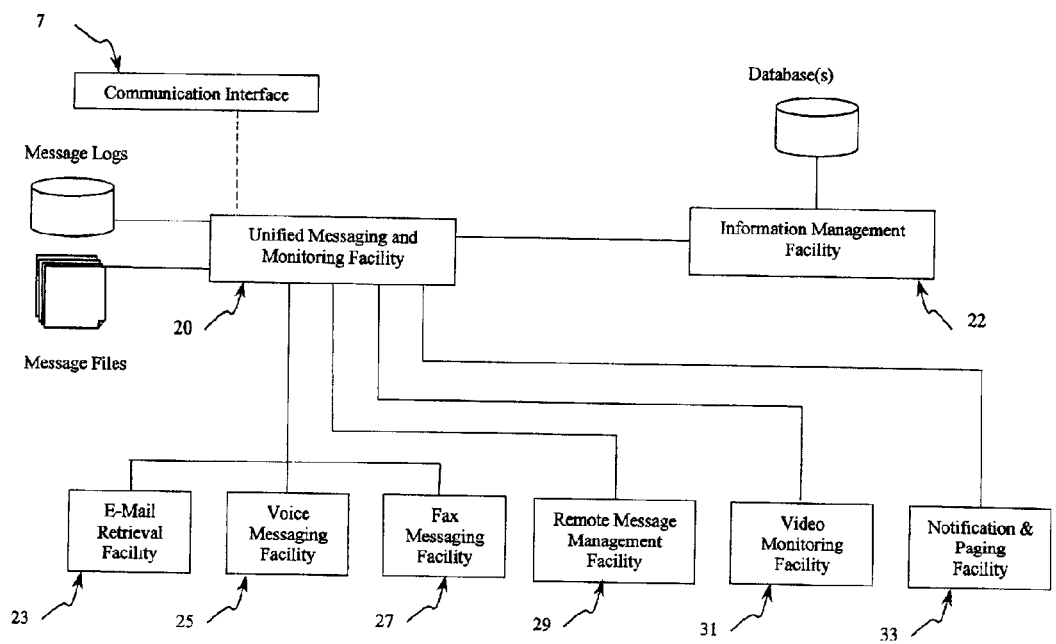
FIG. 4 further illustrates the functions of the Personal Server of the present invention.

As best illustrated in FIG. 4, the principal functions of Unified Messaging and Monitoring Facility 20 are to receive and process messages of all types and content, including e-mail, facsimiles, electronic voice mail, images, video data, executable program code, audio data, formatted data or raw binary data. Unified Messaging and Monitoring Facility 20 is operably associated with communication interface 7.

As illustrated in FIG. 4, Unified Messaging and Monitoring Facility 20 further comprises E-Mail Message Retrieval Facility 23, Voice Message Facility 25 and Fax Messaging Facility 27, illustrated in FIG. 4 and particularized in the Co-Pending Application.

In the present invention, Unified Messaging and Monitoring Facility 20 further comprises Notification Facility 33. This facility is only initiated when a message is received (page, e-mail or short message, depending on the nature of the wireless network) from a valid message originator or a defined event (such as an alarm or occurrence of specific event detected by a video monitor) occurs at Private Server 14, in the manner described below in greater detail. In particular, the Private Server 14 is configured in a manner that is well known, for example by user input with respect to settings, so that particular events or messages are recognized by Private Server 14 for notification in accordance with this invention.

It should be understood that Unified Messaging and Monitoring Facility 20 also comprises for rendering information obtained from any one of the facilities that interface with the Unified Messaging and Monitoring Facility, including the Information Management Facility, in a format that is comprehensible from the Mobile Client Device 30.

In particular, Private Server 14 sends an event notification or Structured Notification (not shown) to Mobile Client Device 30 in response to the receipt of a particular message or occurrence of a particular event at Private Server 14, in a manner that is known. The significance of the Structured Notification is such that it informs the user of Mobile Client Device 30 not only of the particular message or event at Private Server 14, but that the Structured Notification also contains references that can be used in actions resulting from this notification.

In a particular implementation of the preferred embodiments of the present invention, Structured Notification comprises an e-mail link with the following fields:

| | |
|---|---|
| <message identifier> | Identifies the start of the message. |
| <event reference> | Used to access the particular event handling page provided by Wireless Application 311 and Command Operation Facility 307 (see below) |
| <login name> | Used to allow access to the Private Server 14. |
| <computer name> | Used by Server Computer 12 to locate Private Server 14, as explained below. |
| <locator name> | This is used to tell the wireless browser or smart client which location facility to use. This can take the form of an URL, such as www.locator.01com.com or an IP address or a predefined name such as "default" |
| <message identifier> | Identifies the end of the message. |

For example, a representative Structured Notification is: @IIT$1132458.727/smeyer/smcomputer/locator.01com.com@IIT$.

It should be understood that the Structured Notification in operation of the present invention provides enough information permitting Mobile Client Device 30, in either of the preferred embodiments of the present invention, to locate the Personal Server 14 on the Internet, as described below. The only user input generally required from the user of Mobile Client Device 30 in this particular implementation of the preferred embodiments of this invention, is the user's login password.

The purpose of the Structured Notification is to permit the Wireless Device 30 to act on the Structured Notification by means of the Command Operation Facility 307 to locate the Server Computer 12, and thereby the Location Facility 6, and send a request to communicate with Private Server 14. The Location Facility 6, in response to such request, locates the Personal Server 14 (as further explained below) and sends a message to Personal Server 14. Personal Server 14 will generally request a password from the User of Wireless Device 30, upon acceptance of which a communication session is created between Wireless Device 30 and Personal Server 14 in a manner that is well known.

Specifically in accordance with the first preferred embodiment of the present invention, the Structured Notification is converted into an URL that permits the Wireless Browser 312 in the Thin Client implementation to access the Server Computer 12. The URL may also contain a message for Web Server 311 of Personal Server 14 that is passed on to Personal Server 14 in a manner that is known. Web Server 311 will generally require the User of the Wireless Device 30 to login through known authentication functions provided at Personal Server 14. Thereafter, Web Server 311 permits the User from the Wireless Device to interact with the Personal Server 14 by accessing the functions and facilities further described below.

It should also be understood that variations of the Structured Notification are contemplated by the present invention. For example, in a particular implementation of the Structured Notification in accordance with the first preferred embodiment of the present invention, the "<event reference>" field is replaced by a "<specific web page>" field or equivalent that provides access to a specific web page on the Web Server 311 of the Personal Server 14.

In addition, the Unified Messaging and Monitoring Facility 20 and Information Management Facility 22, in co-operation with the system of the present invention, also provide the Remote Message Management Facility 29, as best illustrated in FIG. 4. The particular functions of the Remote Message Management Facility 29 are best illustrated in the Co-Pending Patent Application.

Internet Registration and Location

As stated above, the Server Computer 12 is configured, in a manner that is well-known, to be connected to the network of interconnected computers such as the Internet, and particularly in a manner that accepts Internet requests and translates these requests into a connection between the Server Computer 12 and Private Server 14.

Figure 7:
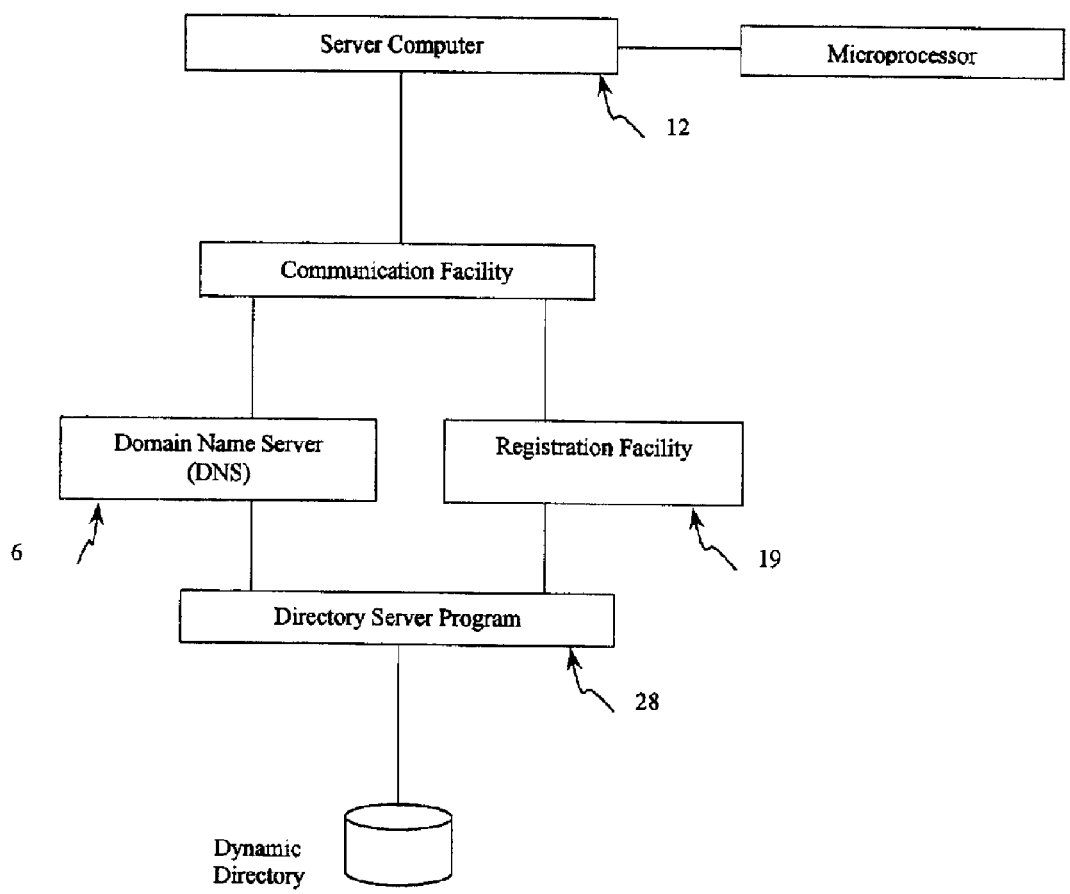
FIG. 7 is a program resource diagram illustrating the resources of the location computer product of the second preferred embodiment of the present invention residing on a public server connected to the Internet to support a message transfer protocol.
Figure 8:
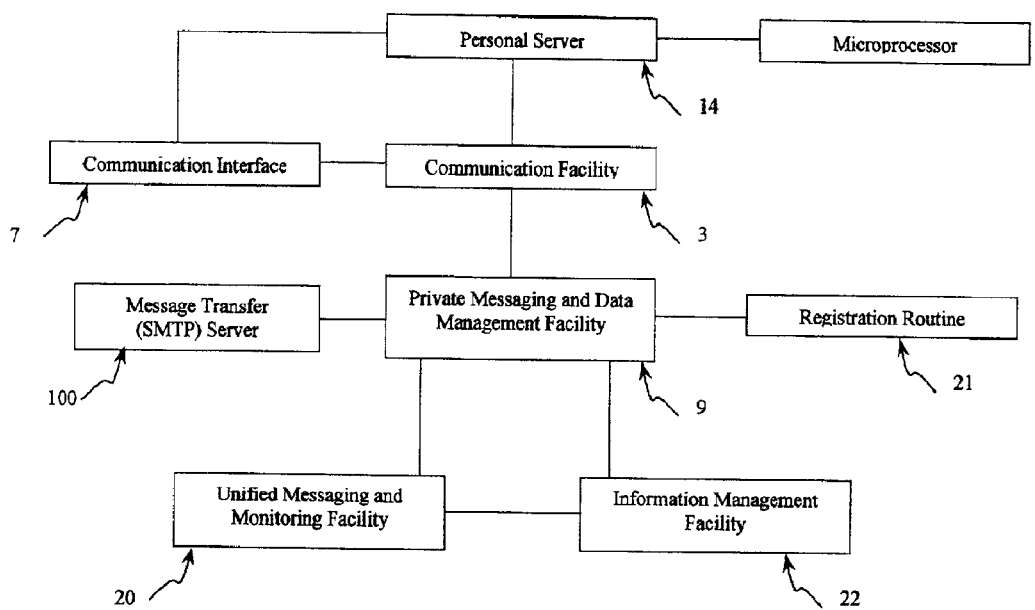
FIG. 8 illustrates the functions of the Personal Server to support a message transfer protocol, in a second preferred embodiment of the present invention.

As best shown in FIGS. 2 and 7, the Location Facility 6 of the present invention further comprises a directory service program 28. In the particular embodiment illustrated herein, the directory service program 28 is operably associated with Server Computer 12. For the sake of clarity, the directory service program 28 can be either resident on the Server Computer 12 or remote from the Server Computer 12 but accessible therefrom, and comprises a dynamic directory provided with capability for dynamically modifying the directory content of the directory service program 28. It is desirable that only users of the present invention be given access to directory service program 28 for purposes of updating or changing the directory information. Such access is provided in association with registration facility 19 as is described below.

In the second preferred embodiment of the present invention, as illustrated in FIG. 7, directory service program 28 is provided using a protocol such as Domain Name Server (DNS) 6.

As illustrated in FIG. 3 Private Messaging and Data Management Facility 9 comprises a Registration Routine 21 provided by registration facility 19 for indicating that Private Server 14 is available to accept messages from the Internet 16. It is desirable for such Registration Routine 21 to be engaged periodically to update the directory service program 28 to address possible changes to the private server's 14 Internet protocol address or its communication session with the second computer (the location facility) for a number of reasons. First, it is desirable to verify that the Internet or server connection of Private Server 14 is active. Second, when the Private Server 14 is configured to provide the functions of this invention, registration with the Server Computer 12 is obviously required. Third, the Registration Routine 21 is required to be engaged periodically to update the directory service program 28 to address possible changes to Private Servers Internet Protocol address. Fourth, from a system resource management point of view it may be desirable to restrict access to the Server Computer 12 to It should be understood that the present invention allows the parameters of the operation of the Registration Routine 21 to be set, in a manner well-known to those skilled in the art, by either the user or the system operator of Server Computer 12, as may be required.

The availability of Private Server 14 to either receive or send communications such as notifications or data residing at Private Server 14 is communicated by Registration Routine 21 by registering a name string or digit string with the directory service program 28 that must not conflict with any other similar name in the dynamic directory associated with directory service program 28. This communication includes the current Internet Protocol address of Private Server 14 that as indicated above may change from time to time. The Internet Protocol address of Server Computer 12, however, is fixed and known to the system described herein.

In the manner described above, the current Internet Protocol address of Private Server 14 is provided from time to time and dynamically stored in directory service program 28.

The System Computer 12 is provided in a manner that permits Server Computer 12 to locate a Private Server 14 and provide the location thereof to a Mobile Client Device 30 regardless of the nature of the Mobile Client Device and associated network 102.

For example, in the second preferred embodiment of the present invention where Mobile Client Device 30 is a "Smart Client", and Mobile Client Device 30 requests to send data to Private Server 14 via the associated wireless network 102, a Message Transfer Agent is used as stated earlier. In particular, the Message Transfer Agent 100 is associated with a wireless network gateway (not shown) that moves messages between the Internet and the wireless network. The Mobile Client Device 30 sends messages via the wireless network to the wireless network gateway. The wireless network gateway will forward the messages to the Message Transfer Agent 100 which will ask Server Computer 12 to look up the address and return the Internet (IP) address of the Private Server 14, in a manner that is well known.

The Domain Name Server 6 will return the Internet address of the Personal Server 14. The wireless network will then transfer the data as a message to the Private Messaging and Information Management Facility 9.

Where the Server Computer 12 has network access to Private Server 14 but Private Server 14 is not accessible from the Internet 16, and may have a network address that is only valid within a network such as a Local Area Network, a Proxy Server (not shown) is used to provide the connection between the Mobile Client Device 30 and Private Server 14, in a manner that is also well known.

When Private Server 14 requests to send data to the Mobile Client Device 30 via the Internet and via the network 102, in the second preferred embodiment of the present invention, the Private Messaging and Information Management Facility 9 will transfer the data as a message to the Message Transfer Agent 100 associated with the wireless network in a manner that is well known. The wireless network will convey the message to the Mobile Client Device 30, for example in the form of Structured Notification described above.

However, in the first preferred embodiment of the present invention, where Mobile Client Device 30 is a WAP-enabled cell phone or Wireless browser, for example, notification may be sent via the Internet using a message transfer protocol, and the computer product of the present invention provided at the Mobile Client Device 30 (best illustrated in FIG. 9) accepts commands and issues responses via the Internet using the HTTP or HTTPS protocols.

The above-described connections provide the means for transferring three kinds of data. First, notification data about messages and events received by the Private Server 14 and notifications of documents and other information managed by the Private Server 14. Second, instructions regarding operations that need to be performed by the Private Server 14 relating to the messages, events, documents and other information. Third, message and document content and other information residing on the Private Server 14 that is to be presented to the user of the Mobile Client Device 30. As is well known to those skilled in the art, providing the functions of the Private Messaging and Information Management Facility 9 requires access to all three kinds of data.

Mobile Client

Figure 5:
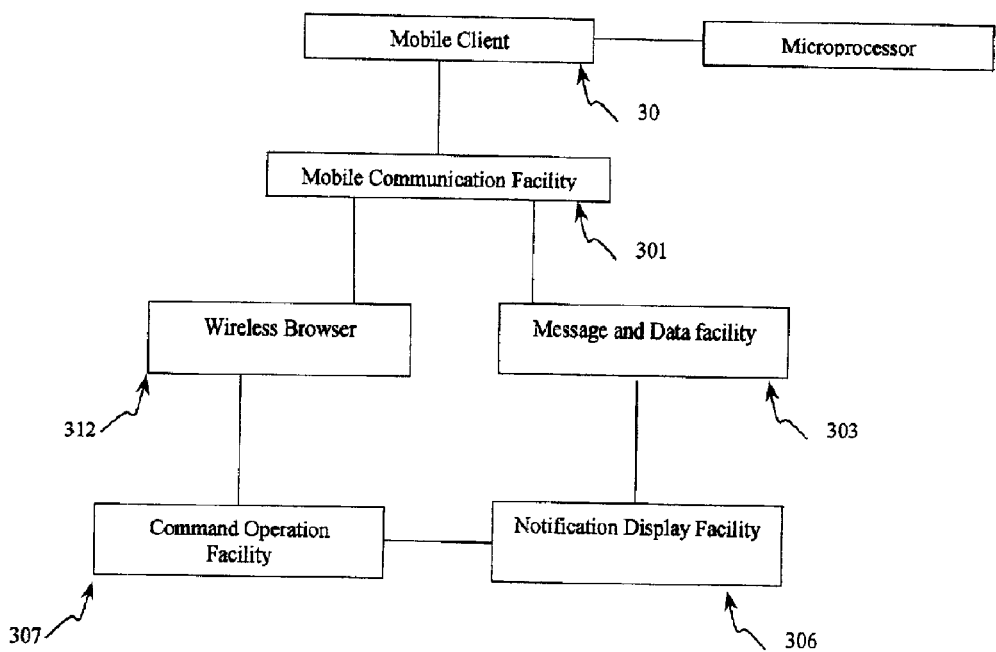
FIG. 5 illustrates the functions of the Mobile Communications Facility of the present invention for a network that supports a mobile browser.
Figure 6:
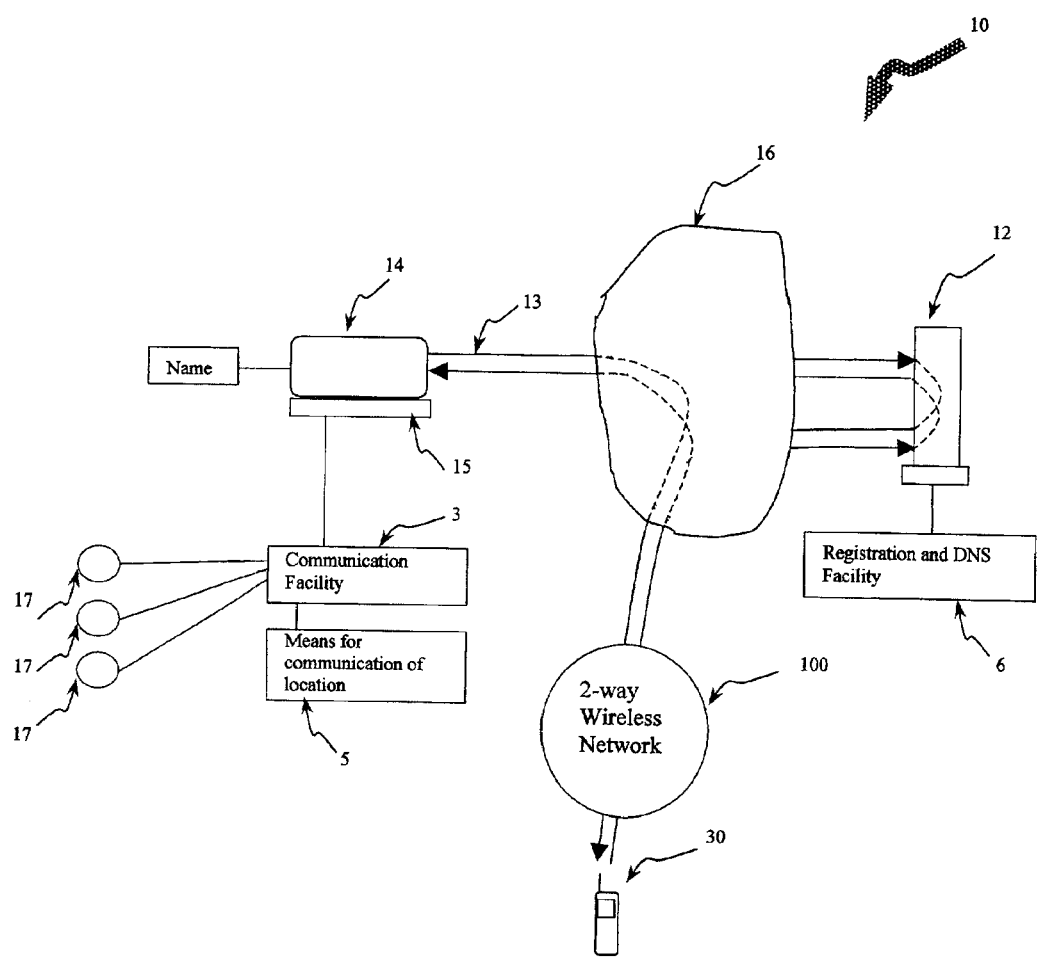
FIG. 6 is a system resource flowchart, in accordance with a second preferred embodiment of the present invention, illustrating the connection of the system to a wireless network that does not support a mobile browser but does support a message transfer protocol.
Figure 9:
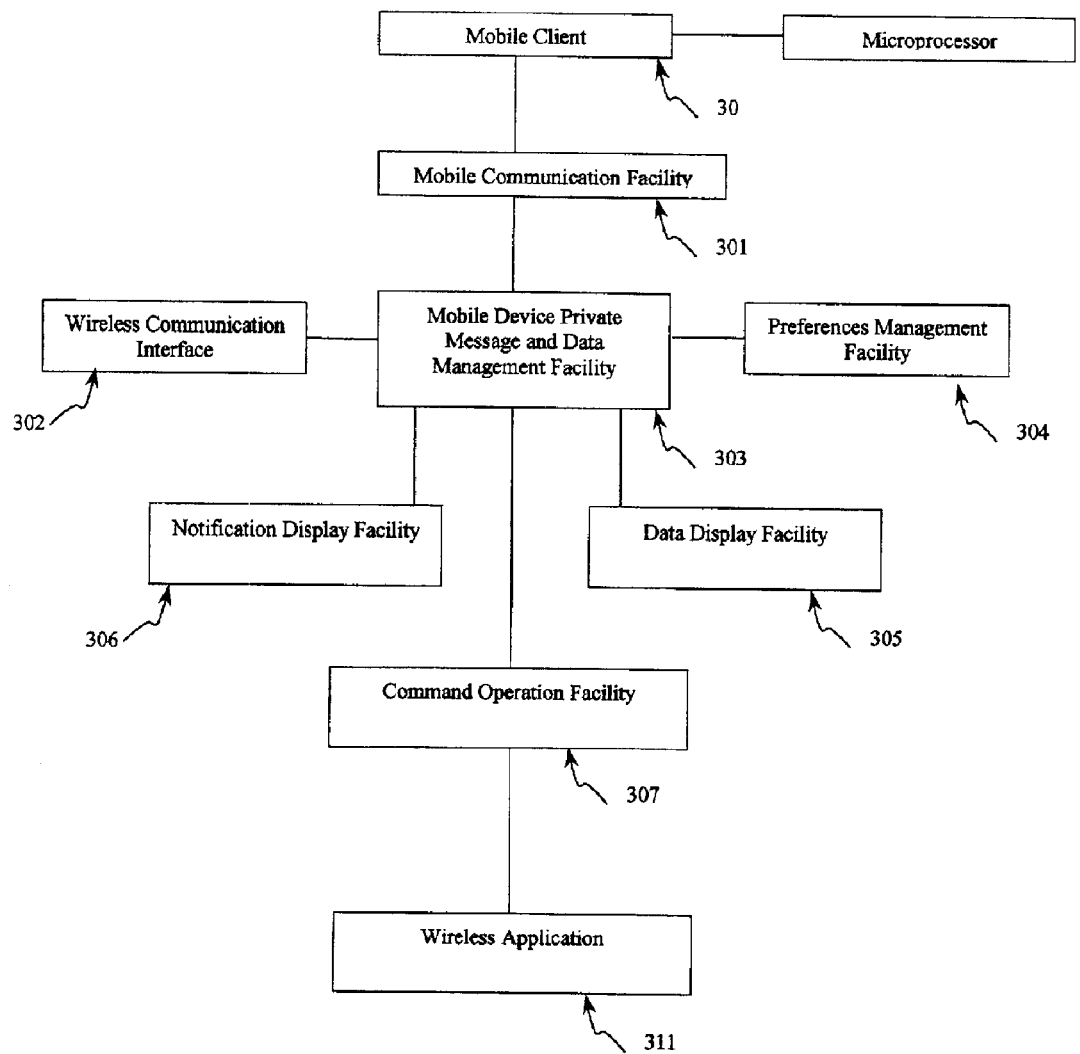
FIG. 9 illustrates the functions of the Mobile Communications Facility of the present invention for a network that supports a message transfer protocol, in a second preferred embodiment of the present invention.

As illustrated in FIGS. 5 and 9, the Mobile Client Device 30 comprises a Mobile Communication Facility 301 that facilitates the communications between the Mobile Client Device 30 and the Private Server 14. Therefore another aspect to the present invention is a computer product residing on Mobile Client Device 30 that provides the features and resources discussed herein.

In the first preferred embodiment of the present invention, as best illustrated in FIG. 5, Mobile Communication Facility 301 comprises a standard wireless browser 312 that runs on the Mobile Client Device 30. Wireless browser 312 enables the user of Mobile Client Device 30 to log in to compatible sites connected to the Internet. In particular, Wireless Browser 312 is adapted to connect to Server Computer 12 for the purpose of location of Private Server 14 as described above. Once the Private Server 14 is located as explained above, the user of the Mobile Client Device 30 logs into his/her account and accesses messages or other data on the Private Server 14. Specifically, the computer product of the present invention provided to Mobile Client Device 30 supports a programmatic interface to point to a particular location, namely the location of Server Computer 12.

In this particular aspect of this invention web protocol (HTTP) is used, but secure web connections such as HHTPS can also be used, depending on the network associated with the particular Mobile Client Device 30. It should be understood that Private Server 14 of the present invention sends the messages or other data to Mobile Client Device, in accordance with settings provided, in a form that is compatible with the capabilities of the Wireless Browser 312. For example, if the Wireless Browser 312 only supports a subset of HTML, a simpler rendering will be used by Information Management Facility 22. Where the Mobile Client Device 30 is a WAP-enabled cell phone, for example, the computer product associated with Private Server 14 comprises a WML application. In either case, the Message and Data Facility 303 provided at Mobile Client Device 30 is adapted to send and receive messages between the Mobile Client Device 30 and Personal Server 14.

Still in the first preferred embodiment of the present invention, best illustrated in FIG. 5, Structured Notifications are received by Message and Data Facility 303. These Structured Notifications are displayed in an interpretable format by means of Notification Display Facility 306. Command Operation Facility 307 provides means for the User of the first preferred embodiment of the present invention to create a request, in the manner described above. Accordingly, the Mobile Communication Facility 301 permits the User of the Wireless Device to act on such notifications by means of Command Operation Facility 307.

In the second preferred embodiment of the present invention as shown in FIG. 9, the Mobile Communication Facility 301 comprises a Wireless Communication Interface 302 that performs the functions related to the interfacing with the wireless network associated with Mobile Client Device 30 in a manner that is well known.

In the second preferred embodiment of the present invention, best illustrated in FIG. 9, the Mobile Communication Facility 301 comprises a Mobile Device Private Messaging and Information Management Facility which in turn comprises a number of facilities. Wireless Communication Interface 302 permits the Wireless Device 30 to interface with the wireless network 102. Preferences Management Facility 304 which is an optional facility that is used to display, set and update user preferences both for the Mobile Client Device 30 and for the remote Private Server 14.

In addition, the Mobile Device Private Message and Information Management Facility 303 provides a number of important functions. First, it comprises a Notification Display Facility 306 which receives notifications from the Private Server 14 of messages, events, documents and other information residing on Private Server 14 and displays such notifications to the user of the Mobile Client Device 30 in a manner that is well known. Second, Mobile Device Private Messaging and Information Management Facility 303 comprises Command Operation Facility 307 which provides means whereby the user can issue commands to the Private Server 14 to perform actions and operation on the data under the management of the Private Server 14 and opening a document managed by the Private Server 14. In the particular implementation of the preferred embodiment of the present invention, Command Operation Facility 307 comprises means to respond to a Structured Notification for example by means of a single click or control selection inputted in Mobile Client Device 30 using a suitable input means in a manner that is known. This input is added to a corresponding Structured Notification and converted into a request that is communicated to Private Server 14, including for the purpose of eliciting a particular response from Private Server 14, such as sending a command or requesting further information from Private Server 14. Mobile Communication Facility 301 also comprises a Data Display Facility 305 for displaying data received from Private Server 14 in accordance with the special requirements of the particular implementation of the present invention. For example, where the data delivered to the Wireless Device 30 comprises stock quotes, Data Display Facility 305 provides means for displaying such data in a scrolling format as is often preferred by Users interested in such data.

It is important to understand that Mobile Device Private Message and Information Management Facility 303 provides the functionality to receive and act on data obtained from the Personal Server 14 without the need for Server Computer 12 once the Personal Server 14 has been located, and also that many of the functions provided by the Web Server 311 in accordance with the first preferred embodiment of the present invention are provided at the Wireless Device 30 by the Mobile Communication Facility 301.

In this manner, it should be understood that the present invention contemplates a "push-pull" capability wherein the Structured Notification provides the means in the present invention both to push information to the Mobile Client Device 30, as well as permit the user of the Mobile Client Device 30 to pull information from the Private Server 14 by converting the Structured Notification into a request as detailed above. The "push" function permits more efficient use of the Mobile Client Device 30 in that reduced user input is required to obtain specified information, as well as reduced bandwidth is utilized to obtain such information. The "pull" mode, on the other hand, provides flexibility and data-on-demand.

Third, Mobile Device Private Message and Information Management Facility 303, further comprises Data Display Facility 305 which provides means for displaying data opened and received by the Mobile Client Device 30 from the Private Server 14. This data may include, but is not limited to, textual message information, document information, graphical information and images.

Security

It is desirable to use a secure communication protocol between the Client Device 30 and the Private Server 14. Message payloads between the two entities should be encrypted using secure encryption techniques in a manner that is well known. It should be understood that the use of other means of providing secured communication between electronic devices in association with the system described herein are contemplated by the present invention.

Full Internet Access

The system provided in this invention allows "full" Internet access to the functions of the Private Messaging and Contact Facility 9 in particular, by operation of the Remote Message Management Facility 29 of the present invention and the Information Management Facility 22, as described above.

This "full" Internet access to data associated with Private Server 14, such as message is best understood by illustration of examples in operation.

Example In Operation

The present invention is best understood in operation in connection with a wireless network 102.

By means of Notification Facility 33, the present invention provides means to notify a user having received new messages, documents or other data over the Internet to the network associated with Mobile Client Device 30, as described above.

The user accesses Wireless Browser 312 in a manner that is known and connects to the Internet. The Wireless Browser 312 (in the first preferred embodiment) automatically points to Server Computer 12. Personal Server 14 is automatically located as specified above. Personal Server 14 is logged on to (password may be required as explained above). The computer product of the present invention provided to Mobile Client Device 30 accesses the details of the message or event that gave rise to the notification and provides the user with options that are displayed and operable via Web Browser 312 as determined by the settings provided to Personal Server 14.

In the particular context of messages stored at Personal Server 14, for example, the list of messages stored on Private Server 14 in association with the computer product of the present invention is accessed, and user may command Private Server 14 to initiate a connection to receive messages from external message stores (e.g. an Internet Service Provider managing a specific e-mail account).

On command from the user by operation of the Command Operation Facility 307 and Data Display Facility 305, the present invention allows individual voice messages to be played, individual e-mail messages to be displayed, e-mail and facsimile messages to be forwarded to a fax machine and forwarded to an external e-mail account. The present invention also allows the user to reply to a message by means of text e-mail or as a generated voice message (by using a text-to-speech facility) that is sent as an e-mail attachment.

The present invention and in particular Mobile Device Private Messaging Information Management Facility 303 also allows the user to access the list of documents and files stored on the Private Server 14 and to display the list to the user. The present invention further allows the user to forward documents as e-mail or facsimile messages or to open a document such that it may be viewed on the Mobile Client Device 30 in co-operation with the Data Display Facility 305.

The present invention also allows a user to access the list of messages via a telephone call to Server Computer 12 by means of suitable telephony hardware and to command Private Server 14 to initiate a connection to receive messages from the external message stores.

The computer product of the present invention may also incorporate text-to-speech technology to provide the full Internet access described herein to a user having a telephone line. This text-to-speech can comprise a variety of commercially available technologies, implemented in a manner that is well known.

It should be understood that messages stored on Private Server 14 is merely representative of data stored on Private Server 14 that can be accessed using Mobile Client Device 30.

Operation of the present invention in accordance with the second preferred embodiment disclosed herein occurs in much the same way, with the exception that communications between the Wireless Device and the Personal Server are processed by Message Transfer Agent 100.

It should be understood that the present invention is not only directed at a system, computer product and method for delivering event notifications from a private communication portal to a Wireless Device, and accessing data at the private communication portal from the Wireless Device so as to obtain such notifications or data regardless of the variable location of a particular private communication portal, but also to obtain such notifications or data from a number of different private communication portals. This permits flexibility to a user of a Mobile Client Device wherein such user can be set up to receive notifications of events occurring at one or more private communication portal, or in fact similar server computers with a variable location on the Internet or a constant location on the Internet, as the case may be. From the perspective of the operator of such private communication portals or server computers, the present invention provides flexibility in terms of the ability of providing new service offerings at Mobile Client Devices with relatively small startup costs or administrative requirements. In either case, Server Computer 12 not only acts as the location facility for determining the availability of other personal servers and/or server computers but also facilitates the provisioning of a number of such private communication portals and severs in accordance with the method disclosed herein.

Other variations and modifications of the invention are possible. In particular a number of computer program facilities are described in this invention as separate facilities for the sake of describing the invention. However, it should be understood that such facilities can be combined with other facilities comprising the present invention, or such facilities can be sub-divided into separate facilities. It should also be understood that various other features or functions can be added to the present invention without departing from the scope of the present invention such as additional means accessing and managing messages and contact information remotely. In addition, it should be understood that the private communication portal can be associated with any means for generating useful data and managing such data where it is desirable to provide remote access to such data in the manner specified herein. For example, as suggested above, the triggering event at Personal Server 14 may be the detection of physical movement in a particular location. Such detection is possible by automatically analyzing the data received from a live video camera. When this occurs, a still image or video clip is saved to memory associated with Personal Server 14. A notification message link is then send to the Mobile Client Device 30 as described herein. When the user thereof activates the link, the Wireless Browser 309 will be instructed to retrieve the image from Personal Server 14 as described above. Similarly, the trigger event may be the activation of an alarm at Personal Server 14 associated, for example, with temperature conditions at a particular location or some other condition or event. The Mobile Client Device 30 permits a user thereof to communicate with Personal Server 14 using the Mobile Client Device 30 to remotely initiate a particular response to the trigger event, for example, resetting the temperature control set point. In addition, it is contemplated that various means for restricting acces to the private communication portal of the present invention other than to authorized users be utilized. It should also be understood that the Private Server of the present invention may comprise more than one copy of the computer product of the present invention. Various means for creating network connections are illustrated herein, however, other means for creating such connections used in conjunction with the invention described are also within the scope of the present invention. All such modifications or variations are believed to be within the sphere and scope of the invention as defined by the claims appended hereto.

We claim:

1. A system for providing access to a remote computer with a dynamic IP address from a wireless device comprising:
   (a) a first computer linked to the Internet and associated with a dynamic IP address, the first computer being further linked to a notification facility, a data communication facility and a database, wherein the notification facility is adapted to create and send a notification that includes data for locating the first computer;
   (b) a second locator server computer linked to the Internet, associated with a static IP address, and including a locating facility for locating the first computer; and
   (c) a wireless device linked to the Internet including a mobile communication facility and a command operation facility linked to the mobile communication facility, wherein;
      (i) the mobile communication facility is adapted to receive the notification from the first computer;
      (ii) the command operation facility is adapted to act on the notification to create a request to the first computer that includes the data for locating the first computer; and
      (iii) the mobile communication facility is adapted to send the request to the second locator server computer thereby initiating the second locator server computer to locate the first computer, the second locator server computer enabling the mobile communication facility to create a communication session between the first computer and the wireless device, and thereby providing access to the functions of the data communication facility and the database from the wireless device.

2. The system as claimed in claim 1, wherein the first computer is linked to the Internet directly or via an Internet gateway/proxy.

3. A system as claimed in claim 2, wherein the wireless device further includes a display facility for displaying information communicated to the wireless device by the first computer.

4. A system as claimed in claim 1, wherein the mobile communication facility is adapted to permit a user of the wireless device to send commands to the first computer.

5. A system as claimed in claim 1, wherein the notification communicated by the first computer includes event notifications.

6. A system as claimed in claim 5, wherein the command operation facility is adapted to permit the user of the wireless device to act on the event notifications by sending commands to the first computer.

7. A system as claimed in claim 6, wherein the commands sent by the wireless device to the first computer include commands for selecting information available at the first computer, and commands to the first computer to procure information from the database and to communicate such information to the wireless device.

8. A system as claimed in claim 5, wherein the event notification includes a structured notification comprising a plurality of fields characterized by:
   (a) a first message identifier identifying the beginning of a message;
   (b) an event reference identifying the nature of the event precipitating the event notification;
   (c) a login name identifying the user of the wireless device;
   (d) a computer name identifying the first computer,
   (e) a locator name identifying the location of the second locator server computer; and
   (f) a second message identifier identifying the end of the message.,
   wherein the plurality of fields are adapted to instruct:
   the second locator sewer computer to locate the first computer and redirect the wireless device to the first computer;
   the first computer to access information requested by the user; and
   the first computer to communicate information to the wireless device.

9. A system as claimed in claim 1, wherein the data communication facility is adapted to interface with a plurality of information generating facilities, wherein the information generating facilities are adapted to generate information, and the communication facility is adapted to communicate the information generated by the information generating facilities to the wireless device.

10. A system as claimed in claim 9, wherein the information generating facilities include messaging facilities, monitoring facilities and database facilities.

11. A system as claimed in claim 10, wherein the data communication facility includes a unified messaging and monitoring facility that is adapted to communicate information to the wireless device upon the occurrence of specific events.

12. A system as claimed in claim 11, wherein the wireless device is adapted to run a browser application, and the mobile communication facility is adapted to support an interface to point the browser application to the second locator server computer.

13. A system as claimed in claim 12, wherein the mobile communication facility is adapted to convert an event notification into a Universal Resource Locator.

14. A system as claimed in claim 13, wherein the first computer includes a web server, and wherein the web server is adapted to process requests received from the wireless device and provide such requests to the unified messaging and monitoring facility for processing.

15. A system as claimed in claim 14, wherein the mobile communication facility includes a smart client application that includes a notification display facility for displaying the event notifications received by the wireless device, a data display facility for displaying data received by the wireless device from the second locator server computer or the first computer.

16. A system as claimed in claim 15, wherein the mobile communication facility further includes a preferences management facility for defining and managing a plurality of preferences in regard to the provisioning of the wireless device based on data obtained from the first computer.

17. A system as claimed in claim 16, wherein the first computer is adapted to obtain login data from the user of the wireless devices so as to authorize the user of the wireless device for communication of information from the first computer to the wireless device.

18. A system as claimed in claim 17, wherein the information obtained at the wireless device from the first computer includes e-mail, facsimiles, electronic voice mails, images, video data, executable program code, audio data, formatted data or raw binary data.

19. A system as claimed in claim 1, wherein the database includes messages, contact information, data files and video images.

20. A system as claimed in claim 1, wherein the second locator server computer includes a directory service program.

21. A system as claimed in claim 20, wherein the directory service program includes a dynamic directory and the contents thereof, and the dynamic directory is adapted for dynamic modification of the contents.

22. A system as claimed in claim 21, wherein the directory service program includes a database management utility that utilizes one or more access protocols.

23. A system as claimed in claim 20, wherein the database management utility utilizes the lightweight directory access protocol.

24. A method of enabling communications between a wireless device and a remote computer with a dynamic IP address, the remote computer including a notification facility, a data communication facility and a database, the method comprising:
   (a) Receiving a notification at the wireless device from the remote computer;
   (b) Acting on the notification by initiating a command operation facility linked to the wireless device to create a request to the first computer that includes the data for locating the first computer; and
   (c) Sending the request to a second locator server computer having a static IP address, thereby initiating the second locator server computer to locate the first computer, the second locator server computer enabling the creation of a communication session between the first computer and the wireless device, thereby providing access to the functions of the data communication facility and to the database from the wireless device.

25. The method claimed in claim 24, further including the step of including in the request to the first computer, a request for particular data included in the database.

26. The method claimed in claim 25, wherein the notification includes an event notification defined by the notification facility.

27. The method claimed in claim 26, wherein the event notification includes a structured notification.

28. The method claimed in claim 27, wherein the command operation facility acts on the structured notification to include in the request based on the structured notification:
   (a) the name of the first computer to enable the second locator server computer to locate the first computer;
   (b) login information associated with a user of the wireless device to enable access to the first computer; and
   (c) data identifiers that identify particular data included in the database requested by the user of the wireless device.

29. A computer program product for use an a wireless device, linked to the Internet, for accessing a first computer, linked to the Internet and having a dynamic IP address and a data communication facility, the computer program product comprising:
- (a) a computer usable medium;
- (b) computer readable program code recorded on the computer useable medium, the computer readable program code defining a mobile communication facility and a command operation facility linked to the mobile communication facility, wherein:
  - (i) the mobile communication facility is adapted to receive a notification from the first computer;
  - (ii) the command operation facility is adapted to act on the notification to create a request to the first computer that includes the data for locating the first computer; and
  - (iii) the mobile communication facility is adapted to send the request to a second locator server computer, linked to the Internet and associated with a static IP address, and including a locating facility, wherein the request initiates the second locator server computer to locate the first computer, the second locator server computer enabling the mobile communication facility to create a communication session between the first computer and the wireless device, and thereby providing access to the functions of the data communication facility and the database from the wireless device.

30. The computer program product as claimed in claim 29, wherein the first computer is linked to the Internet directly or via an Internet gateway/proxy.

31. The computer program product, as claimed in claim 9, wherein the mobile communication facility is adapted to permit a user of the wireless device to send commands to the first computer.

32. The computer program product claimed in claim 30, wherein the computer program code defines on the wireless device a display facility for displaying information communicated to the wireless device by the first computer.

33. A computer program product as claimed in claim 29, wherein the notification communicated by the first computer includes event notifications.

34. A computer program product as claimed in claim 33, wherein the command operation facility is adapted to permit the user of the wireless device to act on the event notifications by sending commands to the first computer.

35. A computer program product as claimed in claim 34, wherein the commands sent by the wireless device to the first computer include commands for selecting information available at the first computer, and commands to the first computer to procure information from the database and to communicate such information to the wireless device.

36. A computer program product as claimed in claim 29, wherein the data communication facility interfaces with a plurality of information generating facilities, wherein the information generating facilities are adapted to generate information, and the computer program codes enables the first computer to communicate the information generated by the information generating facilities to the wireless device.

37. A computer program product as claimed in claim 36, wherein the information generating facilities include messaging facilities, monitoring facilities and database facilities.

38. A computer program product as claimed in claim 37, wherein the data communication facility includes a unified messaging and monitoring facility, and the computer program codes enables the unified messaging and monitoring facility to communicate information to the wireless device upon the occurrence of specific events.

39. A computer program product as claimed in claim 29, wherein the database includes messages, contact information, data files and video images, and wherein the computer program code enables the communication of messages, contact information, data files and video images to the wireless device.

40. A computer program product as claimed in claim 29, wherein the wireless device is adapted to run a browser application, and the computer program code enables the mobile communication facility to support an interface to point the browser application to the second locator server computer.

41. A computer program product as claimed in claim 40, wherein the computer program code enables the mobile communication facility is adapted to convert an event notification into a Universal Resource Locator.

42. A computer program product as claimed in claim 41, wherein the computer program code defines a smart client application that includes a notification display facility for displaying the event notifications received by the wireless device, a data display facility for displaying data received by the wireless device from the second locator server computer or the first computer.

43. A computer program product as claimed in claim 42, wherein the computer program codes defines in the mobile communication facility a preferences management facility for defining and managing a plurality of preferences in regard to the provisioning of the wireless device based on data obtained from the first computer.

44. A computer program product as claimed in claims 43, wherein the computer program code enables the wireless device to obtain login data from the user of the wireless device for communication thereof to the first computer so as to authorize the user of the wireless device for communication of information from the first computer to the wireless device.

45. A computer program product as claimed in claim 43, wherein the information obtained at the wireless device from the first computer includes e-mail, facsimiles, electronic voice mails, images, video data, executable program code, audio data, formatted data or raw binary data.

46. A computer program product as claimed in claim 45, wherein computer program code enables in the mobile communication facility a structured notification including a plurality of fields characterized by:
- (a) a first message identifier identifying the beginning of a message;
- (b) an event reference identifying the nature of the event precipitating the event notification;
- (c) a login name identifying the user of the wireless device;
- (d) a computer name identifying the first computer;
- (e) a locator name identifying the location of the second locator server computer; and
- (f) a second message identifier identifying the end of the message, wherein the plurality of fields are adapted to instruct:
the second locator server computer to locate the first computer and redirect the wireless device to the first computer;
the first computer to access information requested by the user; and
the first computer to communicate information to the wireless device.

* * * * *